United States Patent [19]

Wight

[11] Patent Number: 5,298,752

[45] Date of Patent: Mar. 29, 1994

[54] RETROREFLECTORS FOR INCREASING COLD SHIELD EFFICIENCY

[75] Inventor: Ralph H. Wight, Northport, N.Y.

[73] Assignee: Loral Fairchild Corporation, Syosset, N.Y.

[21] Appl. No.: 953,058

[22] Filed: Sep. 30, 1992

[51] Int. Cl.$^5$ ............................................. G01J 5/06
[52] U.S. Cl. .................................. 250/352; 250/353
[58] Field of Search ................................ 250/352, 353

[56] References Cited

U.S. PATENT DOCUMENTS 4,990,782  2/1991  Wellman et al. ................. 250/353

FOREIGN PATENT DOCUMENTS

61123    3/1988  Japan ................................ 250/352
243820  10/1988  Japan ................................ 250/352

*Primary Examiner*—Carolyn E. Fields
*Attorney, Agent, or Firm*—Sterne, Kessler, Goldstein & Fox

[57] ABSTRACT

A thermal or infrared imaging system having an optical barrel, an external stop formed by a mirror, a dewar, a cold shield, a focal plane array, and multiple retroreflectors. The cold shield and focal plane array are located inside the dewar. The mirror directs desired light bundles at the focal plane array. The retroreflectors are attached to the inside of the optical barrel. The retroreflectors are arranged such that the retroreflectors exist in all lines of sight of the focal plane array, except those lines of sight associated with the external stop. Consequently, the retroreflectors do not interfere with the desired light bundles which are focused onto the focal plane array. However, all light outside of that which is focused is prevented from reaching the focal plane array by the retroreflectors. The retroreflectors are infrared retroreflectors arranged in a matrix. Each of the retroreflectors is a "concave" corner cube having low emissivity reflecting facets. The corner cubes reflect incoming rays by 180 degrees relative to input angles of the incoming rays. Thus, the focal plane array sees only cold outside of the desired light bundles.

19 Claims, 10 Drawing Sheets

RETROREFLECTORS FOR INCREASING COLD SHIELD EFFICIENCY

BACKGROUND OF THE INVENTION

1. Field of The Invention

The present invention is directed to imaging systems, and more particularly to thermal or infrared imaging systems.

2. Related Art

Figure 1:
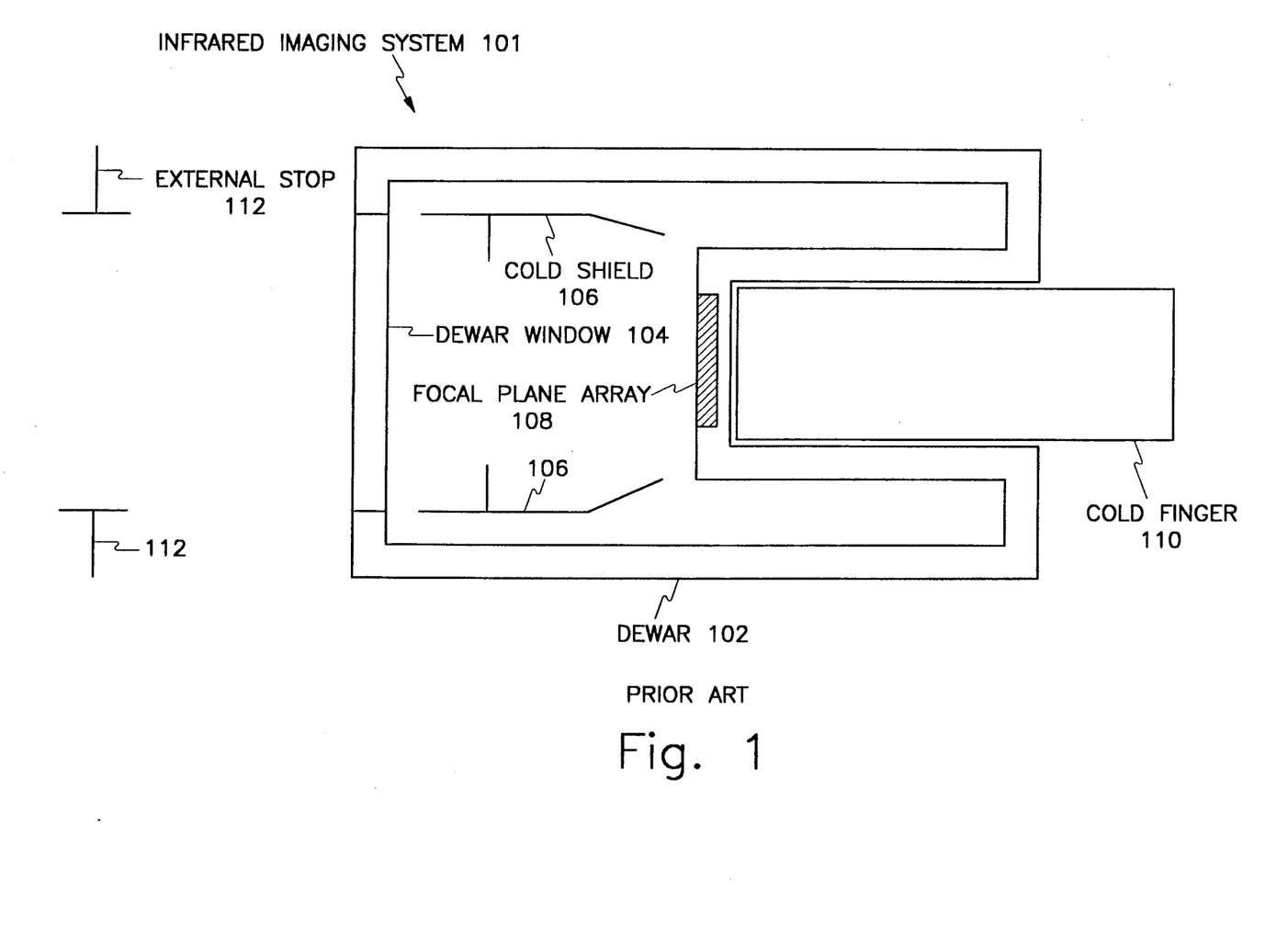
FIG. 1 illustrates a cross-sectional view of a conventional infrared imaging system.

Thermal or infrared imaging systems have increased in importance in recent years. FIG. 1 is a cross-sectional view of a conventional infrared imaging system 101. The infrared imaging system 101 contains an IR detector 108 (also called focal plane array 108).

In order to keep the focal plane array 108 at a cryogenically cool temperature appropriate for thermal energy sensing (typically 77° kelvin or cooler), the focal plane array 108 is integrated into a dewar assembly 102. The dewar 102 is essentially a small insulated container. A cold finger 110 contacts the focal plane array 108 to keep the focal plane array 108 cold. The cold finger 110 is cryogenically cooled from a gas bottle or a cryoengine.

The dewar 102 includes a dewar window 104. The dewar window 104 allows thermal energy into the dewar 102 but also serves as a vacuum seal for the dewar 102.

The infrared imaging system 101 also includes a cold shield 106 (also called a cold stop). The cold shield 106 is uniformly cooled and hence emits little or no thermal energy. The cold shield 106 serves the purpose of limiting the solid angle viewed by the focal plane array 108.

The need for highly efficient cold shielding of the focal plane array 108 is inherent in any high performance infrared imager 101. For conventional scanning infrared focal plane array sensors, such high efficiency cold shielding is normally achieved by making the cold shield aperture (within the dewar 102) the stop of the optical system 101. By doing this, the focal plane array 108 "sees" (in a thermodynamic sense) only the wanted cones of image forming light surrounded by a cold background represented by the cold shield.

In some high performance infrared imagers, however, the focal plane array 108 is perforce located far away from the optical stop of the optical system. Thus, an external stop 112 is used. The dewar 102 in which the focal plane array 108 is located is limited in length by cool-down time and other system constraints. Because of the location of the cold shield aperture, it is impossible for the cold shield itself to act as a stop of the optical system. Thus, an external stop is used. This is further described below with reference to FIGS. 2A and 2B.

Figure 2A:
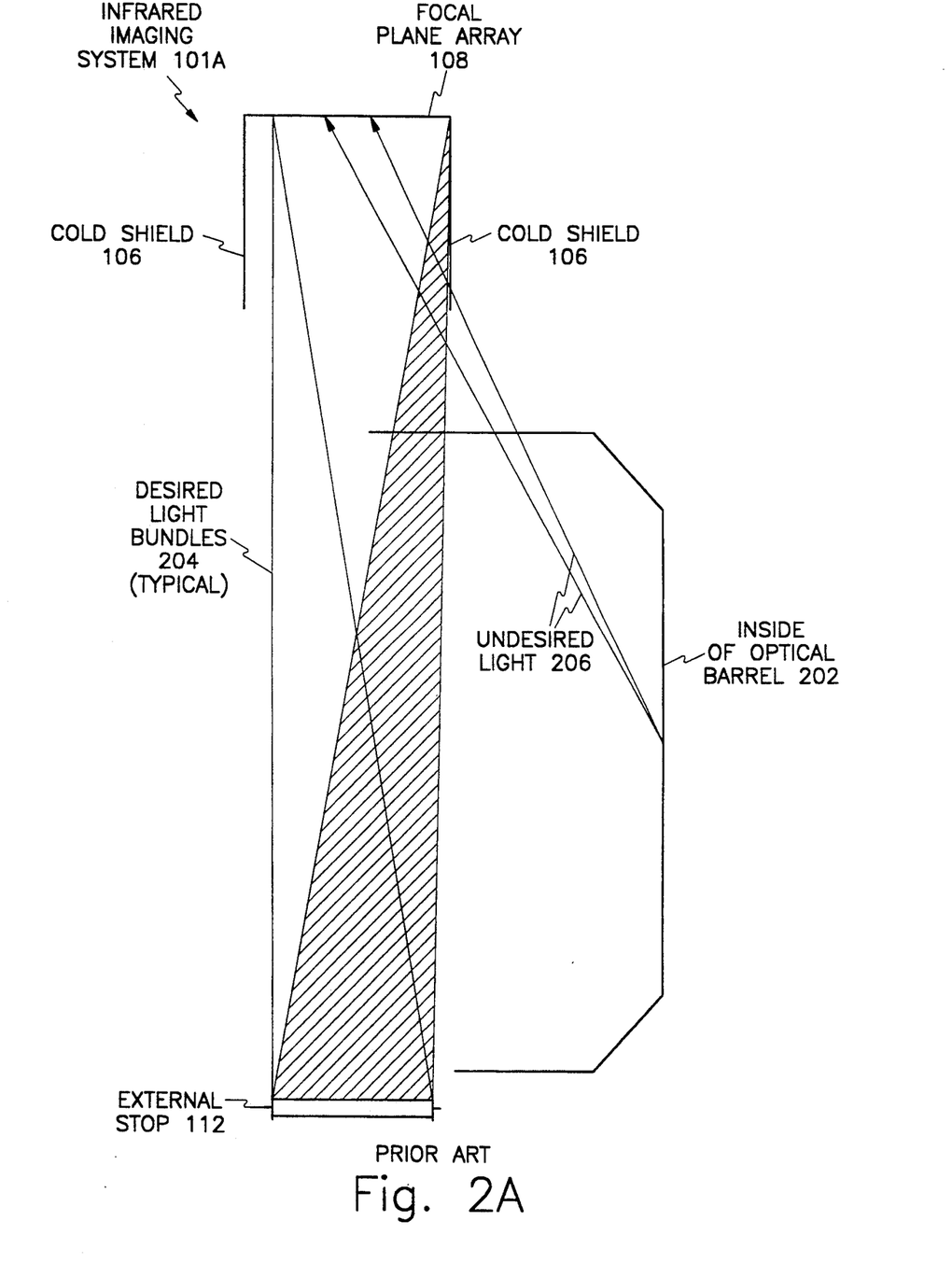
FIGS. 2A and 2B illustrate cross-sectional views of conventional imaging systems wherein cold shields do not establish the optical system stop.

FIG. 2A illustrates a cross-sectional view of a conventional infrared imaging system 101A. As shown in FIG. 2A, conventionally the infrared imaging system 101A is formed in an optical barrel 202. Unlike the cold shield 106, the optical barrel 202 is not cooled. Therefore, the optical barrel 202 emits thermal energy. For readability purposes, only half of the optical barrel 202 is shown.

FIG. 2A illustrates a desired light bundle 204 (one of the many which together image onto a focal plane array 108). Light bundle 204 is limited by the external stop 112 and focused on the focal plane array 108. In this patent document, the terms "light", "ray", and the like refer to the thermal (or infrared) energy contained in such lights or rays.

Also shown in FIG. 2A is undesired light 206 which is typical of that emitted by the inside of the optical barrel 202. The IR focal plane array 108 receives both the desired light bundle 204 and the undesired light 206. The reception of the undesired light 206 degrades the sensing performance of the infrared imaging system 101.

Figure 2B:
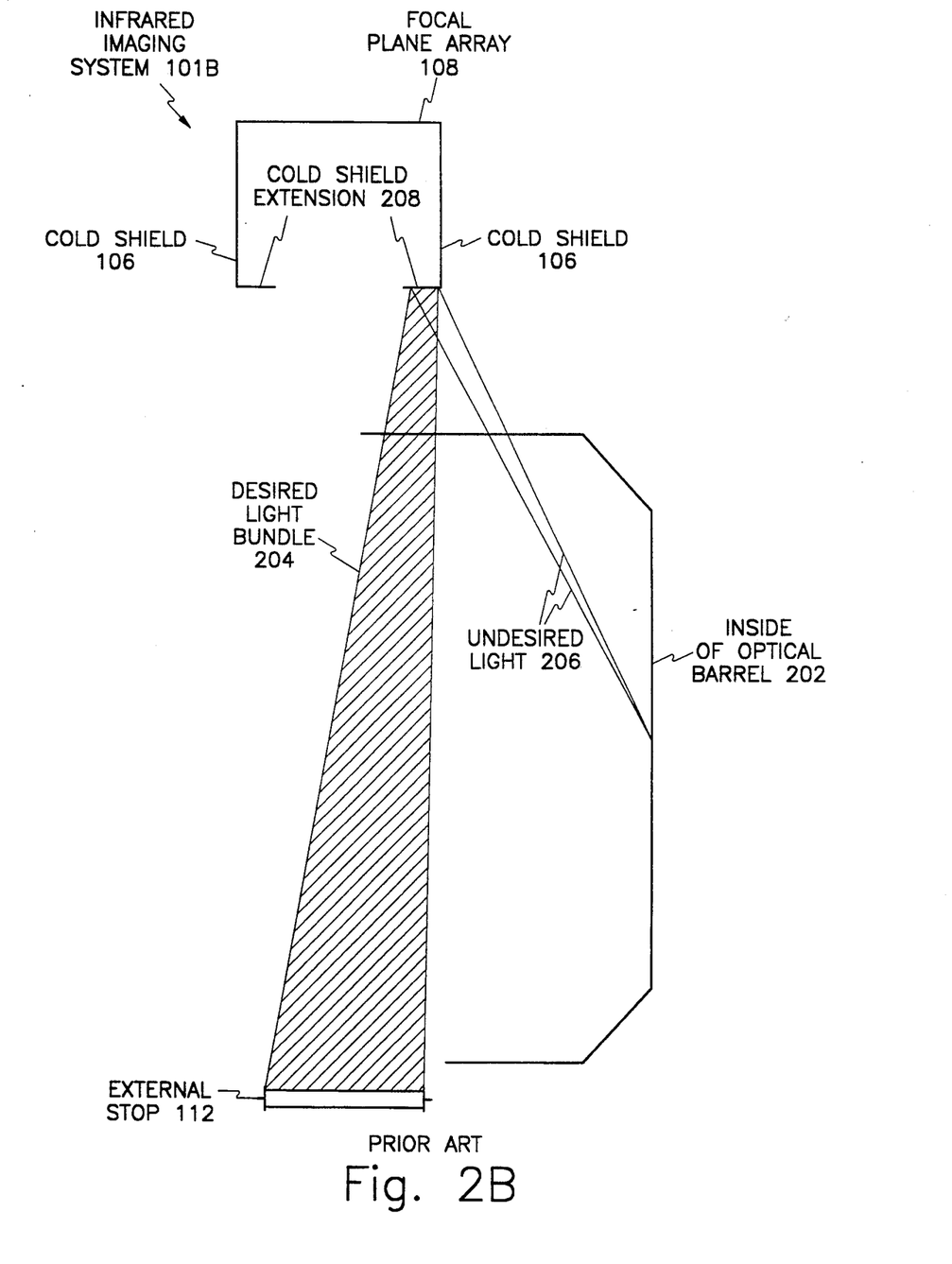

FIG. 2B illustrates a cross-sectional view of a modified conventional infrared imaging system 101B. The modified infrared imaging system 101B includes cold shield extensions 208. The cold shield extensions 208 are advantageous because they block the undesired light 206 from contacting the focal plane array 108. In other words, the cold shield 106 itself acts as a stop of the optical system. Again, only half the optical barrel 202 is shown for readability purposes.

Note, however, that the cold shield extensions 208 are undesirable because they also block the desired light bundle 204 from contacting the IR focal plane array 108. Therefore, the cold shield 106 cannot be modified to block the undesired light 206 because such modifications to the cold shield 106 would also result in a blockage of the desired light bundle 204. In other words, the cold shield 106 cannot act as a stop of the optical system.

Therefore, it is necessary to develop a means by which the focal plane array 108 sees a cold background even though the cold shield aperture does not define the external stop 112.

SUMMARY OF THE INVENTION

The present invention is directed to a thermal or infrared imaging system having an optical barrel, an external stop, a dewar, a cold shield, a focal plane array, and multiple retroreflectors. The cold shield and focal plane array are located inside the dewar. A mirror or lens directs desired light bundles at the focal plane array.

The retroreflectors are attached to the inside of the optical barrel. According to the present invention, the retroreflectors are arranged such that the retroreflectors exist in all lines of sight of the focal plane array, except those lines of sight associated with the stop. Consequently, the retroreflectors do not interfere with the desired light bundles which are focused onto the focal plane array. However, all light, outside of that which is focused, is prevented from reaching the focal plane array by the retroreflectors.

The retroreflectors are infrared retroreflectors arranged in a matrix. Each of the retroreflectors is a "concave" corner cube having low emissivity reflecting facets. The corner cubes reflect incoming rays by 180 degrees relative to input angles of the incoming rays.

Thus, other than the desired light bundles from the stop, the focal plane array only sees reflected rays from the retroreflectors. These reflected rays were emitted from either the cold shield or the focal plane array itself. Since both the cold shield and the focal plane array are cold surfaces, the focal plane array sees (detects) only cold outside of the desired light bundles.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein:

FIG. 4B illustrates a cross-sectional view of the infrared imaging system according to the present invention. FIG. 4B is identical to FIG. 4A except that FIG. 4B focuses on the light that a corner A of the focal plane array receives.

DETAILED DESCRIPTION OF THE PREFERRED EMBODIMENTS

According to the present invention, cold shield efficiency is increased by introducing infrared retroreflectors 304. The retroreflectors 304 are arranged in a pattern such that the focal plane array 108 sees itself (that is, sees a cold surface), from all unwanted non-imaging areas within the line of sight of the focal plane array 108. In other words, the retroreflectors 304 are arranged such that the entire extraneous field of view of the focal plane array 108 (as limited by the cold shield aperture) is made to reflect an image of the cold focal plane array 108, or of cold shield 106, back onto itself, thus providing the cold shield efficiency required.

The characteristics of the retroreflectors 304 shall be described below with reference to FIGS. 3A, 3B, and 3C.

Figure 3A:
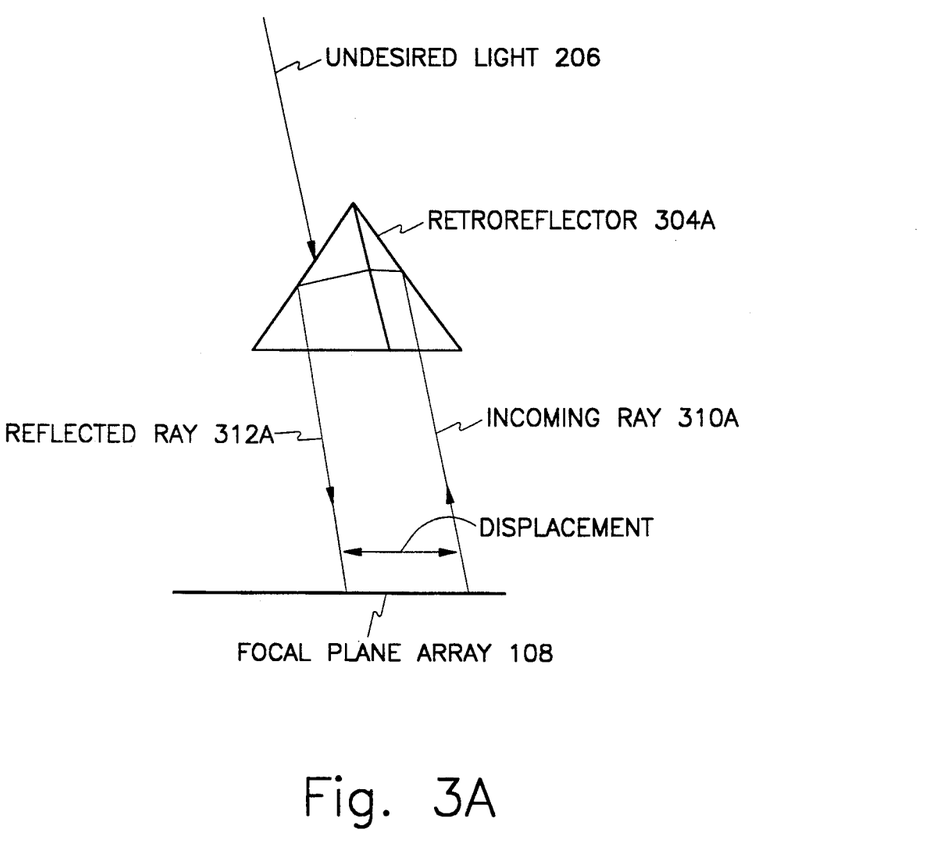
FIGS. 3A, 3B, and 3C illustrate retroreflectors positioned over a focal plane array (FPA).

FIG. 3A illustrates a retroreflector 304A positioned above the focal plane array 108. According to the preferred embodiment of the present invention, the retroreflector 304A is implemented as a "concave" corner cube. Concave corner cubes are well known in the field of optics. Concave corner cubes are used to reflect incident light back to its source. An incident ray will be reflected in the direction from which it came as long as its input angle is within a tolerance of the corner cube.

As shown in FIG. 3A, the focal plane array 108 emits an incoming ray 310A. The retroreflector 304A reflects the incoming ray 310A back to the focal plane array 108 as a reflected ray 312A. The retroreflector 304 reflects the incoming ray 310A by 180° relative to the input angle of the incoming ray 310A.

Note that the reflected ray 312A is displaced from the incoming ray 310A. The reflected ray 312A may be displaced from the incoming ray 310A by as much as the diagonal of the corner cube 304A.

Figure 3B:
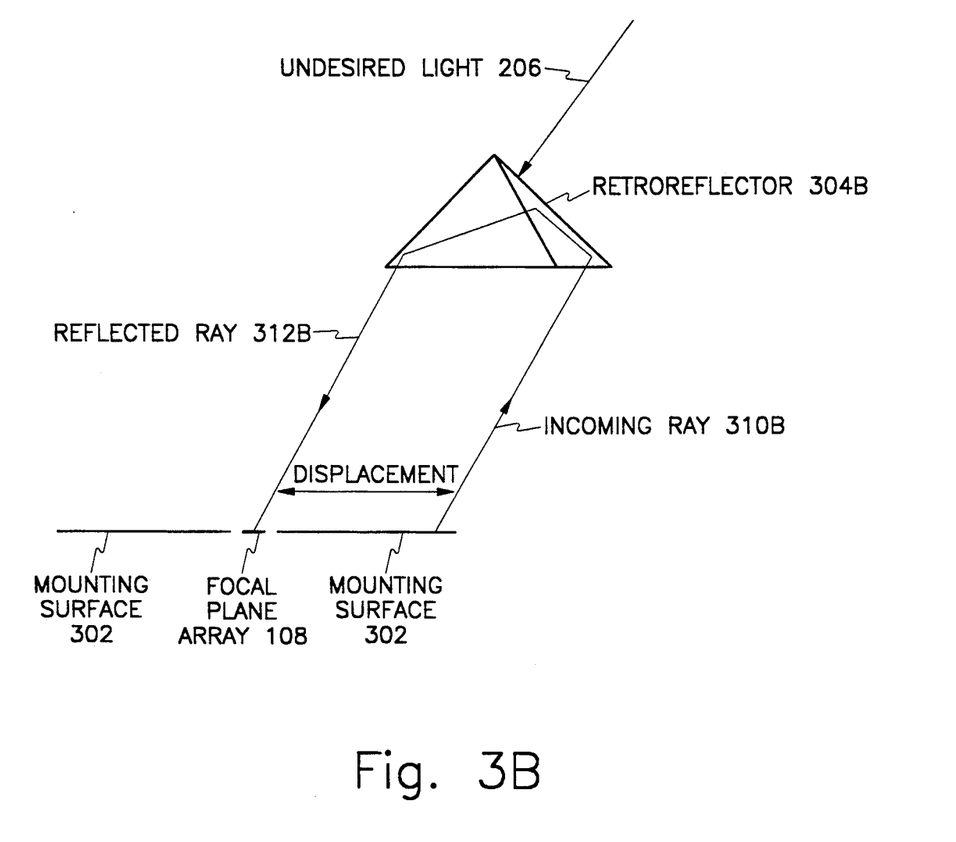

FIG. 3B illustrates the focal plane array 108 mounted on a mounting surface 302. A retroreflector 304B is positioned such that an incoming ray 310B emitted from the mounting surface 302 is reflected to the focal plane array 108 as a reflected ray 312B. As evident from FIG. 3B, the displacement inherent in retroreflectors 304 cause rays emitted from areas other than the focal plane array 108 to be reflected to the focal plane array 108. In order for the focal plane array 108 to see cold from the reflector 304B, the mounting surface 302 must be cryogenically cooled. In other words, the mounting surface 302 must emit little or no thermal energy. This is in fact the case, since the mounting surface 302 is ordinarily a part of the cold shield 106.

FIGS. 3A and 3B illustrate the displacement of retroreflectors 304 wherein the displacement is limited to a single dimension. However, corner cubes 304 see a small area around the focal plane array 108. This is illustrated in FIG. 3C.

Figure 3C:
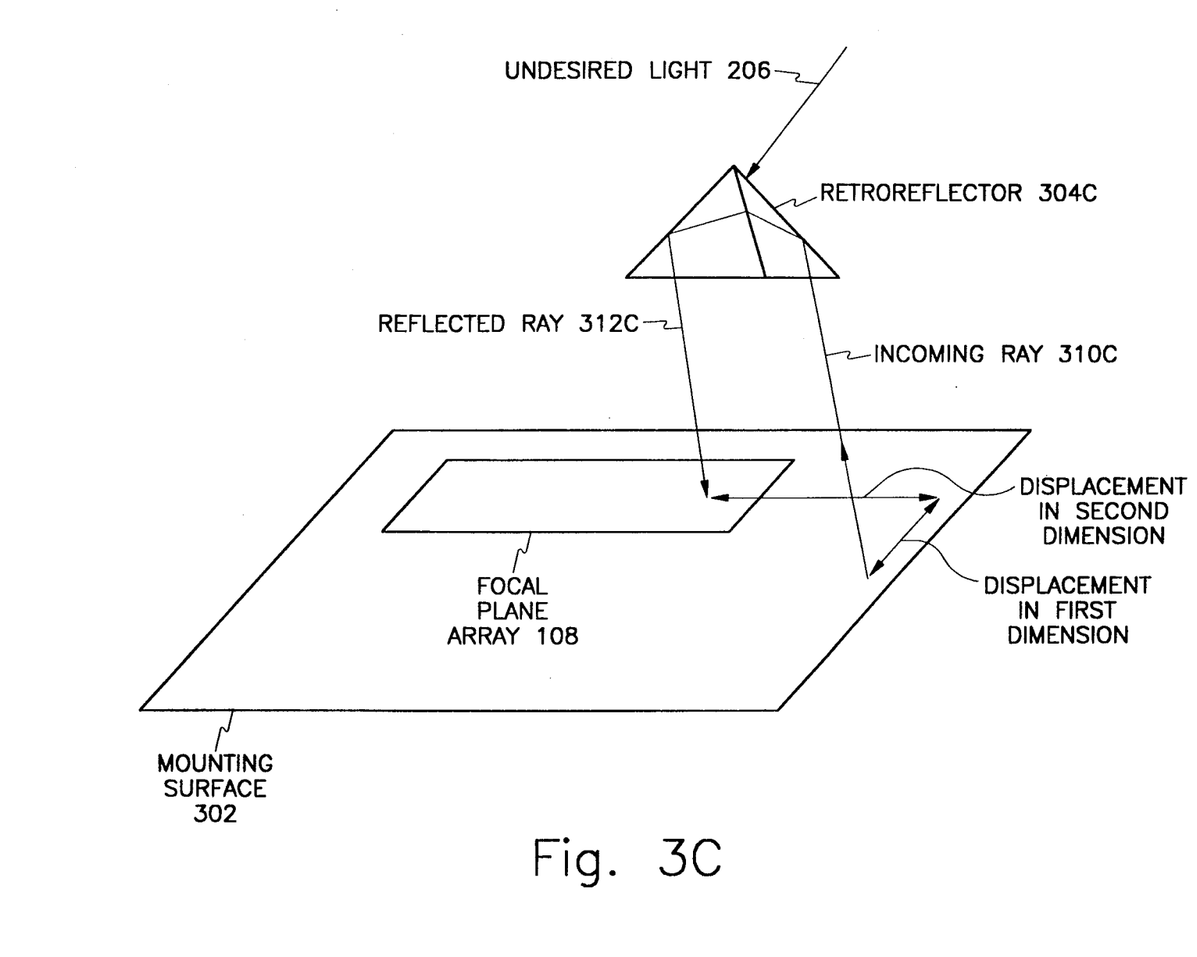

In FIG. 3C, a retroreflector 304C is positioned such that an incoming ray 310C emitted by the mounting surface 302 is reflected to the focal plane array 108 as a reflected ray 312C. The origin of the incoming ray 310C is displaced in two dimensions from the destination of the reflected ray 312C. Therefore, in order for the focal plane array 108 to only see cold from the retroreflectors 304, the focal plane array 108 must be surrounded by cold surfaces. This is in fact the case, since the mounting surface 302 is, as noted above, part of the cold shield 106.

Figure 6:
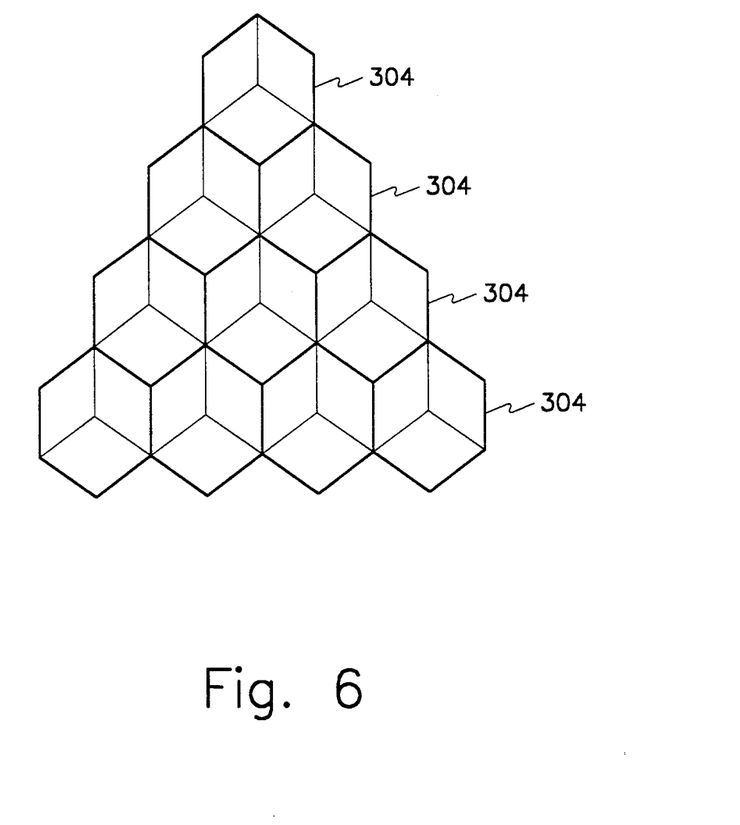
FIG. 6 illustrates a matrix arrangement of multiple small retroreflectors.

According to the present invention, the retroreflectors 304 are formed in a matrix. This is illustrated in FIG. 6, which shows a matrix arrangement of ten small retroreflectors 304. As noted above, each of the retroreflectors 304 is made of a corner cube. The corner cubes have low emissivity reflecting facets.

The corner cubes may be implemented using molded plastic with coating, glass, or electroless nickel. According to the preferred embodiment, the retroreflectors 304 are implemented using electroformed nickel parts having gold coating.

The corner cubes may either be small, medium, or large. Corner cubes which are small are advantageous because they are compact. However, diffraction effects are greater with smaller corner cubes.

Corner cubes which are large are efficient since there is less diffraction. However, large corner cubes are deeper. Therefore, large corner cubes have greater weight and volume.

According to the present invention, the retroreflectors 304 are made using corner cubes of medium size. Such corner cubes strike a balance between all competing parameters.

Note that in FIGS. 3A, 3B and 3C, the retroreflectors 304 prevent the undesired light 206 from reaching the focal plane array 108. This advantageous result of the retroreflectors 304 is discussed in greater detail below.

Figure 4A:
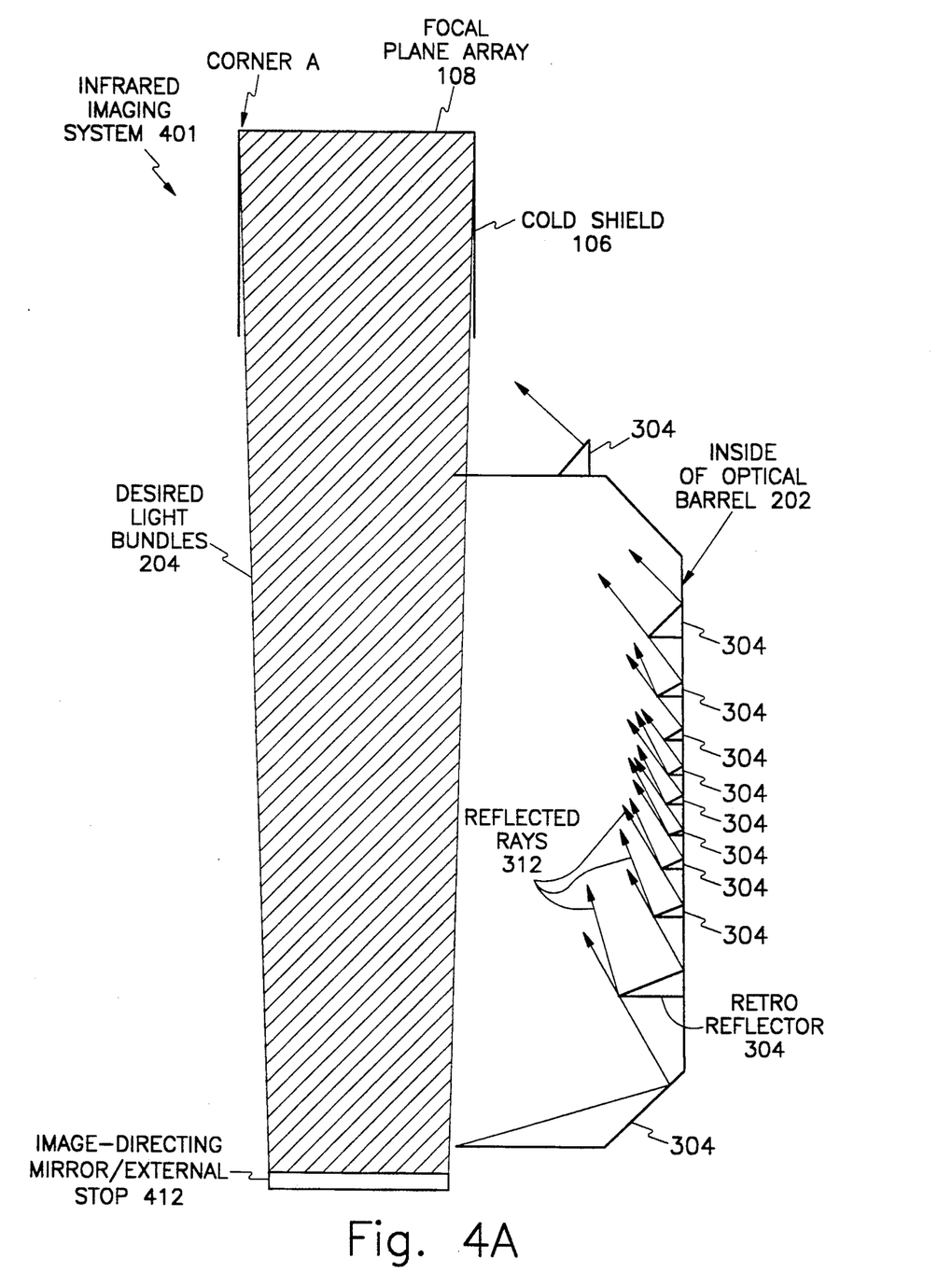
FIG. 4A illustrates a cross-sectional view of the infrared imaging system according to the present invention.

FIG. 4A illustrates a cross-sectional view of an infrared imaging system 401 according to the present invention. The infrared imaging system 401 contains a focal plane array 108, a cold shield 106, and an image-directing mirror which also serves as an external stop 412. The infrared imaging system 401 is formed in an optical barrel 202. For readability purposes, only one half of the optical barrel 202 is shown. These components are well known in the art.

The infrared imaging system 401 also includes multiple retroreflectors 304 which are arranged on the inside of the optical barrel 202. As FIG. 4A illustrates, all of the matrices of retroreflectors 304 are located outside the imaging light path, but within the mechanical confines of the infrared imaging system.

According to the present invention, the retroreflectors 304 are arranged such that the retroreflectors 304 exist in all lines of sight of the focal plane array 108, except those lines of sight associated with the image-directing mirror/external stop 412. Consequently, the retroreflectors 304 do not interfere with the desired light bundles 204 which are focused from the image-directing mirror/external stop 412 to the focal plane array 108. However, all light outside of that which is so focused is prevented from reaching the focal plane array 108 by the action of the retroreflectors 304.

Other than the desired light bundle 204 from the image-directing mirror/external stop 412, the focal plane array 108 only sees the reflected rays 312 from the retroreflectors 304. As discussed above with reference to FIGS. 3A, 3B, and 3C, these reflected rays 312 originated from either the cold shield 106 or the focal plane array 108 itself. Since both the cold shield and the focal plane array 108 are cold surfaces, the focal plane array 108 sees only cold outside of the desired light bundles 204.

Figure 4B:
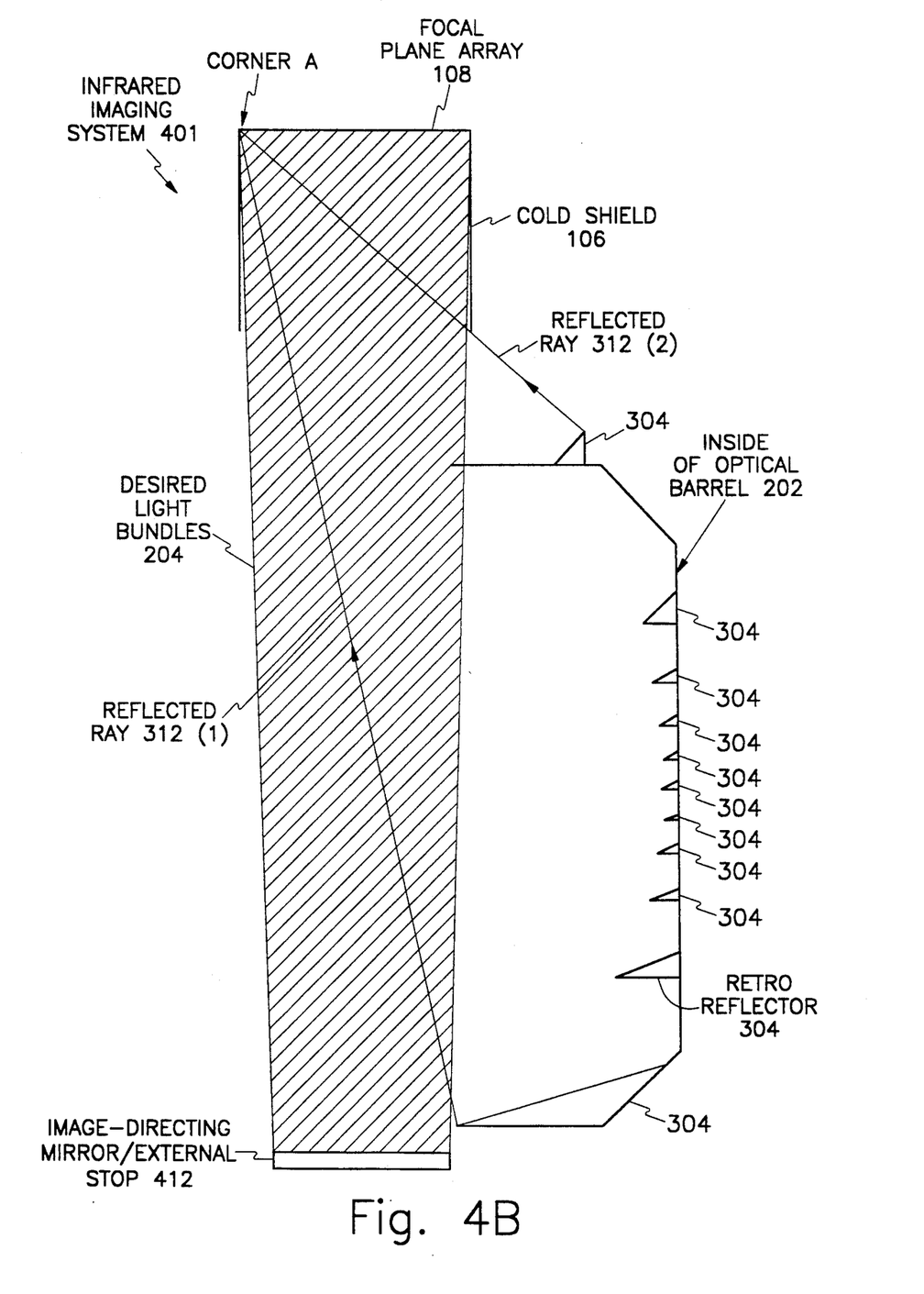

That the focal plane array 108 sees only cold outside of the desired light bundles 204 is more clearly illustrated in FIG. 4B. FIG. 4B is identical to FIG. 4A except that FIG. 4B focuses on the light which a corner A of the focal plane array 108 receives. For readability purposes, only one half of the optical barrel 202 is shown.

In addition to the desired light bundles 204, the corner A receives reflected rays 312 from the retroreflectors 304. These reflected rays 312 are bounded by a reflected ray 312(1) and a reflected ray 312(2). Within the boundaries established by these two reflected rays 312 (1 and 2), the corner A sees only the retroreflectors 304. Consequently, outside of the desired light bundles 204, the corner A sees only cold.

Note that the corner A receives no extraneous light since such extraneous light is blocked by the cold shield 106 and the retroreflectors 304. In other words, the corner A sees only the desired light bundles 204 from the image-directing mirror/external stop 412. Outside of the desired light bundles 204, the corner A sees only cold.

Figure 5:
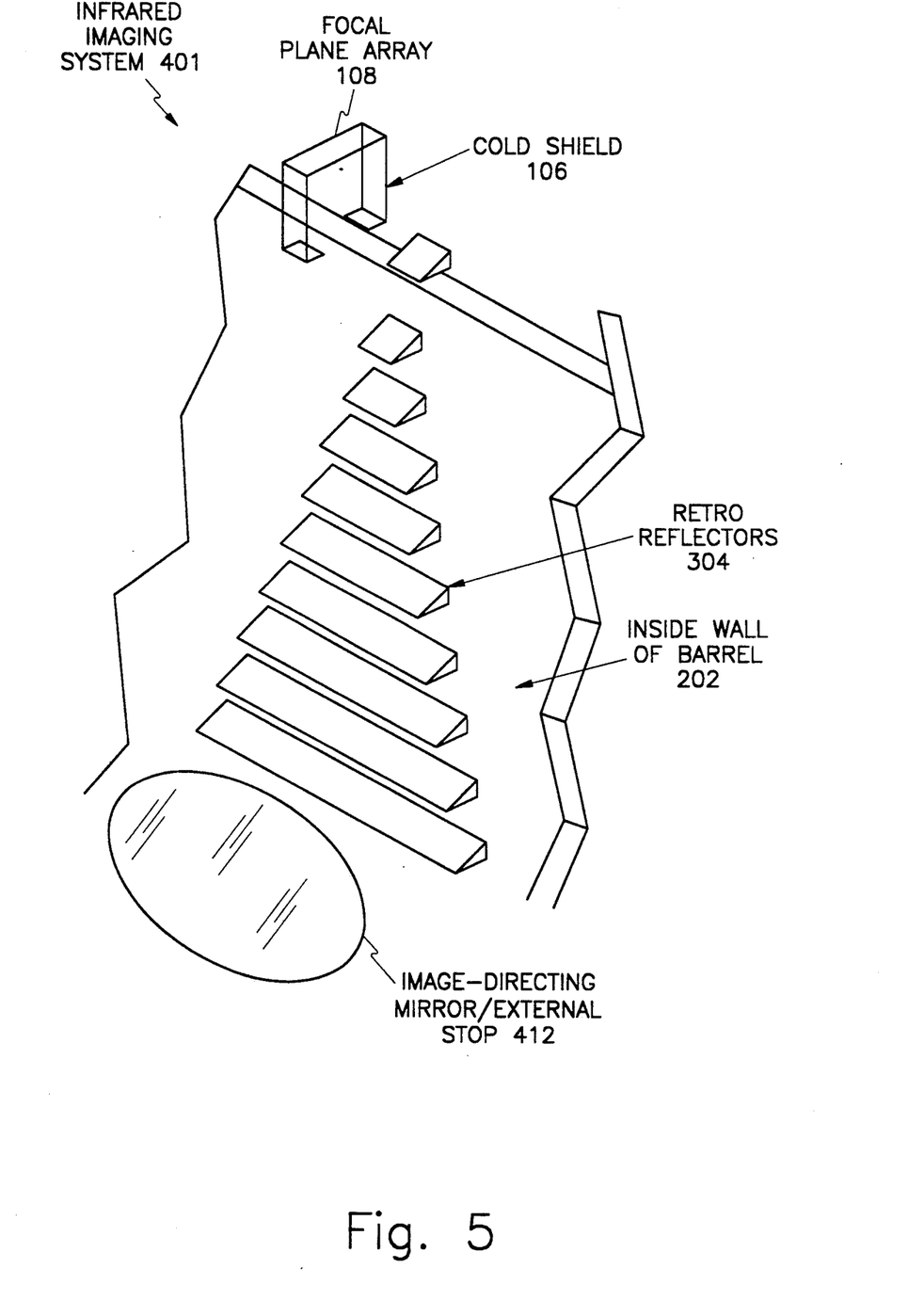
FIG. 5 graphically illustrates the infrared imaging system according to the present invention.

The manner in which the retroreflectors 304 are arranged on the inside wall of the barrel 202 is further illustrated in FIG. 5. As illustrated in FIG. 5, the width of the retroreflectors 304 increases with the distance away from the focal plane array 108. Such a configuration is necessary since the line of the focal plane array 108 increases with the distance away from the focal plane array 108.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An imaging system, comprising:
   (a) an optical barrel having a first end, a second end, and an inner side;
   (b) insulating means, coupled to said first end, having an aperture;
   (c) a focal plane array, located inside said insulating means, having a first field of view established by said aperture;
   (d) focusing means, coupled to said second end, for defining a second field of view of said focal plane array, wherein said second field of view is a subset of said first field of view; and
   (e) reflecting means, coupled to said inner side of said optical barrel, for causing said focal plane array to detect a cold surface outside said second field of view but inside said first field of view.

2. The imaging system of claim 1, wherein said insulating means comprises:
   a dewar having a dewar window;
   a cold shield located inside said dewar; and
   a cold finger positioned adjacent to said focal plane array.

3. The imaging system of claim 1, wherein said focusing means comprises means for directing desired light bundles at said focal plane array through said aperture.

4. The imaging system of claim 1, wherein said focusing means comprises an optical stop disposed at a distance from the cold shield.

5. The imaging system of claim 1, wherein said focal plane array comprises means for sensing infrared rays.

6. The imaging system of claim 1, wherein said focal plane array is mounted on a cold surface.

7. The imaging system of claim 6, wherein said reflecting means comprises one or more retroreflectors coupled to said inner side and located outside said second field of view but inside said first field of view.

8. The imaging system of claim 7, wherein each of said one or more retroreflectors comprises means for preventing undesired light from reaching said focal plane array.

9. The imaging system of claim 7, wherein said one or more retroreflectors comprise infrared retroreflectors arranged in a matrix.

10. The imaging system of claim 7, wherein each of said one or more retroreflectors comprise a concave corner cube having low emissivity reflecting facets.

11. The imaging system of claim 10, wherein said corner cube comprises means for reflecting an incoming ray, having an input angle, by 180 degrees relative to said input angle.

12. The imaging system of claim 10, wherein said corner cube comprises nickel parts with gold coating.

13. An imaging system, comprising:
   (a) an optical barrel having a first end, a second end, and an inner side;
   (b) insulating means, coupled to said first end, having a cold surface and an aperture;
   (c) a focal plane array, located inside said insulating means and mounted on said cold surface, having a first field of view established by said aperture;
   (d) focusing means, coupled to said second end, for defining a second field of view of said focal plane array, wherein said second field of view is a subset of said first field of view; and
   (e) one or more retroreflectors coupled to said inner side and located outside said second field of view but inside said first field of view, each of said one or more retroreflectors comprising a corner cube having low emissivity reflecting facets.

14. The imaging system of claim 13, wherein said corner cube comprises means for reflecting an incoming ray, having an input angle, by 180 degrees relative to said input angle.

15. The imaging system of claim 13, wherein said corner cube comprises means for preventing undesired light from reaching said focal plane array.

16. An imaging system comprising:

(a) an optical barrel having a first end, a second end, and an inner side;
(b) a focal plane array, configured to receive infrared rays;
(c) a dewar, coupled to said first end of said optical barrel, and coupled to said focal plane array, having a dewar window;
(d) a cold shield, located inside said dewar, configured to limit a solid angle viewed by said focal plane array;
(e) a cold finger, positioned adjacent to said focal plane array, configured to keep said focal plane array cold;
(f) an image-directing mirror/external stop, coupled to said second end of said optical barrel, configured to define a second field of view of said focal plane array, wherein said second field of view is a subset of said first field of view; and
(g) retroreflectors, coupled to said inner side of said optical barrel, configured to block undesired light from reaching said focal plane array.

17. The imaging system of claim 16, wherein said retroreflectors comprise a plurality of concave corner cubes arranged in a matrix.

18. The imaging system of claim 17, wherein each concave corner cube is configured to reflect an incoming ray, having an input angle by 180° relative to said input angle.

19. The imaging system of claim 18, wherein said corner cube comprises nickel parts with gold coating.

* * * * *